Figure 2:
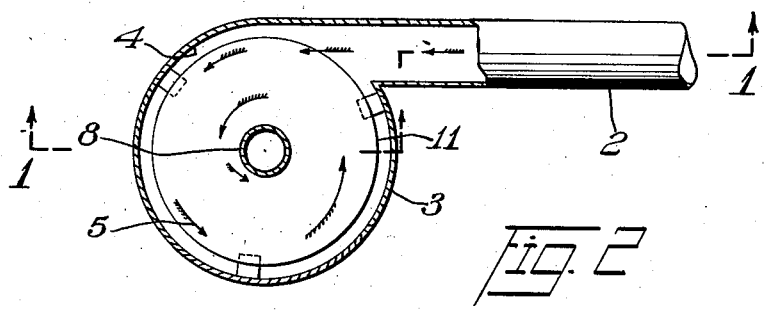

Nov. 14, 1939. D. M. CARR ET AL 2,179,919
TREATMENT OF SLUDGES
Filed Nov. 25, 1936

Dugald M. Carr
William S. Pilcher   INVENTORS
BY Benton A. Bull
ATTORNEY.

Patented Nov. 14, 1939

2,179,919

UNITED STATES PATENT OFFICE 2,179,919

TREATMENT OF SLUDGES

Dugald M. Carr, Gibbstown, and William S. Pilcher, Wenonah, N. J., assignors to E. I. du Pont de Nemours & Company, Wilmington, Del., a corporation of Delaware Application November 25, 1936, Serial No. 112,834

3 Claims. (Cl. 260—580)

The present invention relates to a new and improved process for the reduction of aromatic nitrocompounds to aromatic amines by means of heavy metals, and pertains particularly to the step of recovering the unreacted metal from the resulting sludge in said process.

As is well known in the art, reduction products of aromatic nitrocompounds may be prepared by reactions involving a heavy metal and water. For the preparation of the primary reduction products, for example, acid reduction is employed, and suitable catalysts such as ferrous chloride, aluminum chloride and the like are frequently added to accelerate the reaction. For the production of secondary reduction products, on the other hand, basic or alkaline reductions are carried out.

The reduction of nitrobenzene to aniline by means of iron is a reaction of the former type, and serves to illustrate the principles of the present invention. According to one process of the prior art, nitrobenzene, water, iron and ferrous chloride are charged into a reducing vessel and caused to react, with suitable agitation. Since the reaction is exothermic, no large supply of heat is required during the greater part of the reaction period beyond that necessary, initially, to raise the materials to their reaction temperature. However, as the reaction approaches completion, the equilibrium is such that it is necessary to introduce steam through the reactants for several hours, or to employ other heating means, in order to convert the last portion of the nitrobenzene to aniline. The latter feature is extremely disadvantageous for several reasons. A great deal of time is wasted in converting a proportionately small amount of nitrobenzene. A substantial loss of energy is involved both in generating the steam or other heat, and in prolonging the operation of the means of agitation employed. In addition, any water introduced into the system as steam must be distilled later with still further loss in energy and efficiency.

The chief object of the present invention is the development of a new and more efficient process for the reduction of aromatic nitrocompounds to the corresponding aromatic amines. A further object is a more efficient process for reduction of nitrobenzene to aniline by means of iron, wherein the process is rendered more efficient by the recovery of the unreacted iron. A still further object is the separation of finely divided metals generally from their mixtures with oxides of the respective metals. Additional objects will be apparent from the following detailed description of our invention.

We have discovered that the disadvantages may be overcome and the foregoing objects accomplished, according to the principles of our invention, by the efficient utilization of an excess of iron during the reduction of the nitrocompound. By employing such an excess, substantially complete conversion of the nitrocompound, nitrobenzene in particular, in a relatively short period is assured and the final introduction of heat or steam is shortened with a marked increase in efficiency. The use of such an excess has been carefully avoided in the processes of the prior art due to the fact that it has been considered impossible to bring about an efficient recovery of the unchanged excess iron from the sludge produced. This difficulty is due to the extremely unpleasant nature of the aniline sludge. This material, which consists largely of oxides of iron, possesses physical properties which render it extremely difficult to handle. While wet, it consists of a heavy slime which will clog any filter and is very damaging to apparatus. Attempts to force it through an opening in apparatus result in broken belts, gears and the like on the driving machinery. When the sludge begins to dry it forms a mass having the consistency of concrete. This effect is increased by the presence of metallic iron therein. Attempts to heat the material to a high degree of dryness, result in a dust so fine as to pass through the smallest aperture, pollute the air, and cause unbearable discomfort to workmen.

Various attempts have been made to develop a workable process for the recovery of metallic iron from the sludge. Screening has proved unpracticable, for the damp material rapidly accumulates cohesively on the screens and clogs them. Drying the material requires too much energy due to the cohesion with which the final portion of moisture is retained. Beyond this stage, the material is dust-like in consistency and pollutes the air and equipment of the entire plant. Magnetic separation of the iron from the sludge is likewise impossible, since the oxide is also magnetic.

We have discovered that the excess of metallic iron may be effectively recovered from the sludge by forming a thin slurry of the iron-bearing sludge with water or other suitable liquid, followed by a cyclonic separation of the metallic iron from said slurry. The term "thin" slurry, of course, has no bearing upon the operability of the process disclosed, but will be understood by a worker in the art to represent a slurry which will flow through any standard conduit equipment.

In order to describe more clearly this cyclonic method of separation, reference is made to the attached drawing which illustrates the general principles involved. It is to be understood, however, that this is done solely by way of example, and is not to be regarded as a limitation upon the scope of our invention, which has many important applications other than those hereinafter particularly described with reference to the drawing.

Similar characters are employed in the drawing and throughout the accompanying description to refer to corresponding features in the process according to our invention.

Figure 1:
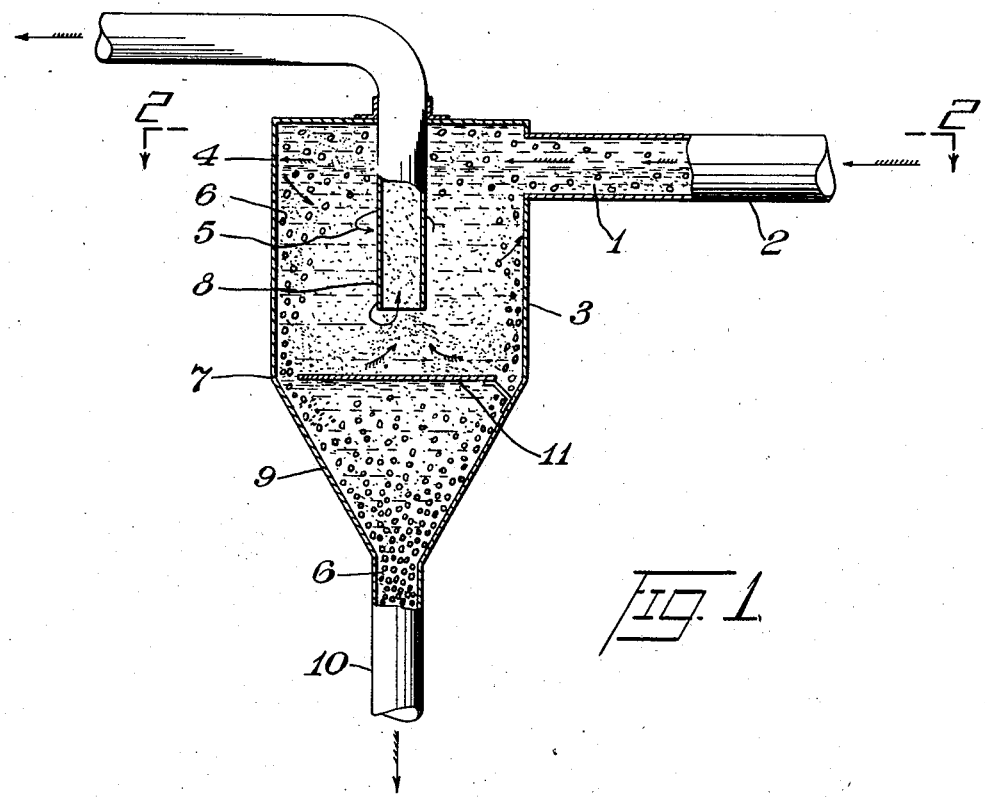

Referring generally to the drawing, Figure 1 is a vertical section of the cyclonic separator, while Figure 2 is a horizontal section of the apparatus shown in Figure 1.

Referring to the figures, a slurry 1 comprising sludge, metallic iron and water is forced by pumps or other suitable means, through the conduit 2 into the separating chamber 3, where it impinges tangentially at a substantial velocity on the wall of said chamber near locus 4. Upon such impact, the velocity of the heavier iron particles is greatly reduced and, instead of conforming to a cyclonic path such as that indicated by the arrow 5, with the other constituents, the iron 6 sinks to the lower portion of the chamber near the wall, as depicted at locus 7 of Figure 1. The rest of the stream, after circulating around the chamber, exits through discharge pipe 8. The settling action may be enhanced by the presence of the conical chamber 9 leading into the smaller discharge pipe 10. A baffle 11, supported by convenient brackets, is conveniently placed opposite the mouth of the discharge pipe 8 to form a large upper central portion of the conical chamber, in order to maintain a higher velocity of discharge through 8 without settling of iron oxide at that point. The slurry is so fed to the apparatus that the entire separator is filled with liquid throughout the separation.

The advantages of our process may be seen from an analysis of the material recovered through this process at pipe 10, as follows:

|  | Per cent |
|---|---|
| Metallic iron: | |
| +20 mesh | 58.3 |
| +65 mesh | 27.5 |
| −65 mesh | 2.2 |
| Water | 7.35 |
| Iron oxide | 4.65 |

The metallic iron thus recovered is screened and returned to the reduction chamber for reduction of further charges of the nitrobenzene.

The process according to our invention effects a substantially complete separation of the metallic iron from aniline sludge, thus permitting the efficient utilization of an excess of iron during the reduction, with consequent conservation of time and energy by curtailment of the final steam heating period, and of the prolonged agitation, and by decreasing the burden of subsequent distillation.

In the foregoing detailed description of our invention, it is apparent that many variations may be made without departing from the spirit and scope thereof. For instance, although the process is described with particular reference to the nitrobenzene, and aniline sludge, it is likewise applicable to the reduction of aromatic nitrocompounds generally to the corresponding aromatic amines by means of metals; for example, the reduction of nitrotoluene to toluidine, or nitroxylene or xylidine. In fact it may be used with advantage in the case of any mixture of metallic iron or other metal in finely divided form with the oxides of the respective metals. We therefore intend to be limited only in accordance with the following patent claims.

We claim:

1. The process for the recovery of metallic iron from a sludge comprising iron and at least one iron oxide, which process comprises adding liquid to said sludge to form a slurry, passing said slurry in a continuous stream through a settling chamber, abruptly deflecting said stream into a cyclonic path within said chamber and thereby causing the particles of iron to settle.

2. In the process for reducing an aromatic nitrocompound to an aromatic amine by means of iron with subsequent recovery of the excess iron from the resulting sludge, the novel step of recovering said unreacted iron, which step comprises adding liquid to said sludge to form a slurry, passing said slurry in a continuous stream through a settling chamber permitting the separation of the heavier particles upon deflection, abruptly deflecting said stream in a cyclonic path within said chamber, thereby causing the particles of metallic iron therein to settle, and removing said settled particles from the locus of the settling section.

3. In the process of reducing nitrobenzene to aniline by means of iron with subsequent recovery of the excess iron from the resulting sludge, the novel step of recovering said unreacted iron, which step comprises adding liquid to said sludge to form a slurry, passing said slurry in a continuous stream through a settling chamber permitting the separation of the heavier particles upon deflection, abruptly deflecting said stream in a cyclonic path within said chamber, thereby causing the particles of metallic iron therein to settle, removing said settled particles from the locus of the settling action, and reutilizing said iron in further reduction of nitrobenzene.

DUGALD M. CARR.
WILLIAM S. PILCHER.